Patented Oct. 31, 1933

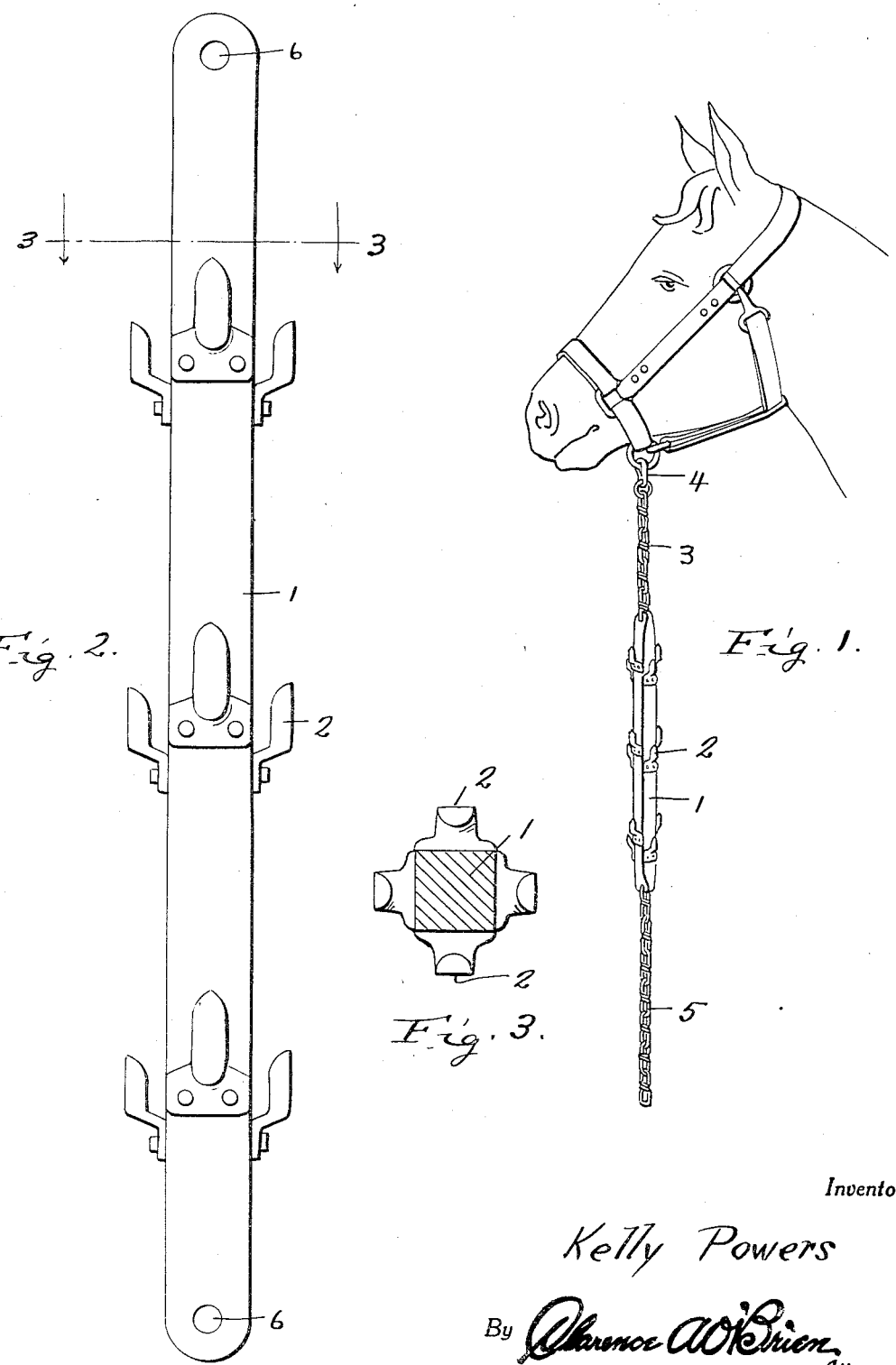

1,932,910

UNITED STATES PATENT OFFICE 1,932,910

ANIMAL POKE

Kelly Powers, La Grange, Ind.

Application March 31, 1933. Serial No. 663,802

3 Claims. (Cl. 119—136)

This invention relates to an animal poke, the general object of the invention being to provide means for preventing an animal from jumping over a wire fence or reaching over or through the fence.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:—

Figure 1 is a view showing the invention in use.

Figure 2 is a view of the device itself.

Figure 3 is a section on line 3—3 of Figure 2.

As shown in these views, the device comprises a body part 1 which may be formed of any suitable material, though it is preferably formed of metal and may be of solid construction, as shown, or of hollow construction. Upwardly extending hook members 2 are riveted or otherwise fastened to the sides of the body member and these hook members are preferably arranged in pairs, with the members of each pair arranged on opposite sides of the body member, with the hook members arranged on all four sides of the member. Also each pair of members on two sides of the body member are arranged slightly above the adjacent pair on the other two sides of the member, as shown in Figure 2. Thus the hook members are arranged in groups of four each, with the groups spaced apart, as shown. Each hook member includes a substantially vertical outer part which has a flat outer face and a substantially semi-circular inner face so that the hook member will not tend to catch in weeds, grass and the like and to retain such material, though these hook members will engage the wires of a fence when the device is suspended from the halter of a horse by a chain 3 and the snap hook 4. Thus the device will prevent an animal from jumping the fence or from reaching over the fence or through the fence.

In order to add weight to the device so that it will remain in a vertical position, as shown in Figure 1, I attach a second chain 5 to the lower end of the device. The chains 3 and 5 are preferably connected to the body member 1 through means of the holes 6 formed in the ends of said body member.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. A poke comprising a body member of rectangular shape in cross section, upwardly extending hooks connected to the sides of said member with the hooks arranged in vertically spaced groups, with some of the hooks of each group arranged slightly above the other hooks of said group, a flexible member connected with the top of the body member and a weighted flexible member connected to the bottom of said body member.

2. In a poke, a body member, upwardly extending hooks connected to the sides of said member with the hooks arranged in vertically spaced groups, and with some of the hooks of each group arranged slightly above the other hooks of said groups.

3. In a poke, an elongated body member of rectangular shape in cross section, a plurality of fence engaging members connected to the sides of said body member with said fence engaging members arranged in vertically spaced groups with some of the fence engaging members of each group arranged slightly above the other fence engaging members of said group.

KELLY POWERS.